US006334814B1

(12) United States Patent
Adams

(10) Patent No.: US 6,334,814 B1
(45) Date of Patent: Jan. 1, 2002

(54) METHOD OF PLAYING GAME AND GAMING GAMES WITH AN ADDITIONAL PAYOUT INDICATOR

(75) Inventor: William R. Adams, Las Vegas, NV (US)

(73) Assignee: Anchor Gaming, Las Vegas, NV (US)

( * ) Notice: Subject to any disclaimer, the term of this patent is extended or adjusted under 35 U.S.C. 154(b) by 0 days.

(21) Appl. No.: 09/157,996

(22) Filed: Sep. 22, 1998

Related U.S. Application Data

(63) Continuation-in-part of application No. 08/907,764, filed on Aug. 8, 1997, now Pat. No. 5,848,932, which is a continuation-in-part of application No. 08/311,783, filed on Sep. 23, 1994, now abandoned.

(51) Int. Cl.[7] ................................................ A63F 13/00

(52) U.S. Cl. ........................ 463/20; 463/46; 273/143 R

(58) Field of Search .......................... 273/143 R, 138.2, 273/138.1, 138 A, 138 R; 463/20

(56) References Cited

U.S. PATENT DOCUMENTS

| | | | |
|---|---|---|---|
| 3,281,149 | A | 10/1966 | Miller |
| 4,700,948 | A | 10/1987 | Okada |
| 4,805,907 | A | 2/1989 | Hagiwara |
| 4,871,171 | A | 10/1989 | Rivero |
| 4,906,005 | A | 3/1990 | Manabe |
| 5,167,413 | A | 12/1992 | Fulton |
| 5,205,555 | A | 4/1993 | Hamano |
| 5,259,616 | A | 11/1993 | Bergmann |
| 5,342,049 | A | 8/1994 | Wichinsky et al. |
| 5,344,145 | A | 9/1994 | Chadwick et al. |
| 5,486,005 | A | 1/1996 | Neal |
| 5,628,684 | A | 5/1997 | Bouedec |
| 5,695,402 | A | 12/1997 | Stupak |
| 5,707,285 | A | 1/1998 | Place et al. |
| 5,722,891 | A | 3/1998 | Inoue |
| 5,772,509 | A | 6/1998 | Weiss |
| 5,823,874 | A | 10/1998 | Adams |
| 5,848,932 | A | 12/1998 | Adams |
| 5,882,261 | A | 3/1999 | Adams |
| 5,911,418 | A | 6/1999 | Adams |
| 5,927,714 | A | 7/1999 | Kaplan |
| 6,048,268 | A | 4/2000 | Humble |
| 6,089,978 | A | 7/2000 | Adams |

FOREIGN PATENT DOCUMENTS

| | | |
|---|---|---|
| DE | 2938307 | 4/1981 |
| DE | 3700861 | 7/1988 |

(List continued on next page.)

OTHER PUBLICATIONS

Bueschel, Richard M., "An Illustrated Price Guide to the 100 Most Collectible Trade Stimulators," 1978, pp. 21, 29, 83.
Bueschel, Richard M., "Slots 1," 1978, pp. 136, 142.
Geddes, Robert N., "Slot Machines on Parade," Oct. 1980, p. 128.
Advertisement, Bally Distributing Company, Double or Nothing, Model 1083, Ch. 11, 1975–1984, p. 267.
Fey, Marshall, "Slot Machines," 1983, p. 126, 150.
Intergame Magazine, Jun. 1995, cover and pp. 91, 101.
English Translation of French Patent No. 1474617.
English Translation of Japanese Patent No. 5131044.
Letter dated Apr. 5, 2001 from WMS Gaming.

(List continued on next page.)

*Primary Examiner*—Mark S. Graham
(74) *Attorney, Agent, or Firm*—TraskBritt

(57) ABSTRACT

Gaming devices comprising a standard gaming unit, e.g., three reels, and a discernible additional payout indicator, e.g., a rotatable wheel. A preferred bonus payout indicator is clearly visible by the player and is actuatable when the reels of the slot machine stop on certain predetermined indicia. A preferred embodiment further comprises a payout multiplier which displays a plurality of values by which a payout may be multiplied.

14 Claims, 8 Drawing Sheets

FOREIGN PATENT DOCUMENTS

| | | | | | |
|---|---|---|---|---|---|
| DE | 4014477 | | 7/1991 | | |
| EP | 0333338 | | 9/1989 | | |
| FR | 1474617 | | 3/1967 | | |
| GB | 1242298 | | 8/1971 | | |
| GB | 2066991 | | 7/1981 | | |
| GB | 2072395 A | * | 8/1981 | ............. | 273/143 R |
| GB | 2072395 | | 9/1981 | | |
| GB | 2083936 | | 3/1982 | | |
| GB | 2084371 | | 4/1982 | | |
| GB | 2096376 | | 10/1982 | | |
| GB | 2153572 | | 8/1985 | | |
| GB | 2170938 | | 8/1986 | | |
| GB | 2182186 | | 5/1987 | | |
| GB | 2182186 A | * | 5/1987 | ............. | 273/143 R |
| GB | 2191030 | | 12/1987 | | |
| GB | 2201821 | | 9/1988 | | |
| GB | 2202984 | | 10/1988 | | |
| GB | 2242300 | | 9/1991 | | |
| GB | 2242300 A | * | 9/1991 | ............. | 273/138 A |
| JP | 5131044 | | 5/1993 | | |

OTHER PUBLICATIONS

X's and O's, *A Brief Informal History of Tic Tac Toe*, Bally Midway Mfg. Co., 1983.

Tic Tac Strike, Williams Electronics Games, 1986.

Criss Cross Cash, Mazooma Games, 1998.

Andy's Full House, Barcrest, 1994.

Andy♥Flo, Barcrest, 1995.

Criss Cross, *The Next Generation*, JPM (Automatic Machines) Ltd., 1980's.

* cited by examiner

METHOD OF PLAYING GAME AND GAMING GAMES WITH AN ADDITIONAL PAYOUT INDICATOR

RELATED APPLICATION DATA

This application is a continuation-in-part of U.S. patent application Ser. No. 08/907,764 filed on Aug. 8, 1997, now U.S. Pat. No. 5,848,932 which is a continuation-in-part of U.S. patent application Ser. No. 08/311,783 filed on Sept. 23, 1994, now abandoned.

The present invention is directed to novel gaming devices and, more particularly, to gaming devices comprising at least primary and secondary events capable of providing at least one of a plurality of payouts.

BACKGROUND OF THE INVENTION

Games of chance have been enjoyed by people for years and have enjoyed widespread popularity in recent times. Many people enjoy playing a wide variety of games that they have not played before. Playing new games adds to the excitement of this recreational activity particularly when some form of "gaming" is involved. As used herein, the term "gaming" and "gaming devices" are used to indicate that some form of wagering is involved, and that players must make wagers of value, whether actual currency or some equivalent of value, e.g., token or credit.

One popular game of chance that has long been enjoyed by many players is the slot machine. Conventionally, a slot machine is configured for a player to input something of value, e.g., a standard denomination of currency or house token or other representation of currency or credit, and then to permit the player to activate the device which causes a plurality of reels to spin and ultimately stop to display a random combination of some form of indicia, for example, numbers or symbols. If this display contains one of a preselected plurality of winning combinations, the machine releases money into a payout chute or onto a credit meter for the player. For example, if a player initially wagered two coins of a national currency and that player won a high payout, that player may receive fifty coins of the same denomination in return.

Since it is desirable to offer players games which they have not played before, it would be desirable to provide a player with new games and additional opportunities to receive winning payouts.

Those familiar with games involving winning payouts, such as the popular television game show entitled "WHEEL OF FORTUNE" will realize that as players and observers watch a large wheel spin and gradually come to rest, the players experience a heightened feeling of anticipation and excitement as the wheel is slowing down to indicate a possible prize.

It would therefore also be desirable to provide a payout indicator which is discernible by a player and/or other observers.

SUMMARY OF THE INVENTION

Various embodiments of the present invention comprise methods of playing games, gaming devices and table games utilizing a primary game, e.g., rotatable reels, and at least one discernible indicia of a secondary game, preferably comprising a payout indicator. The secondary game is separate from the primary game either physically or temporally.

According to the most preferred embodiments, a bonus payout indicator is clearly visible to a player and is operable when primary reels of a primary game slot machine stop on certain predetermined indicia. According to one preferred embodiment of the present invention, a secondary payout indicator is in the form of a rotatable bonus wheel which can be caused to spin automatically or in response to some action by a player, e.g., the player pushing a button, when the primary game indicates one of a predetermined plurality of indicia. The wheel is caused to gradually reduce speed and when the wheel stops, a pointer indicates the payout to be awarded to the player.

Another preferred embodiment of the present invention further comprises a discernible multiplier which provides the ability to change either the payout from the primary gaming unit or the secondary payout indicator, or both. As described in more detail below, it is within the scope of the present invention to provide a payout from the primary gaming unit, a payout indicated by the secondary indicator only, a payout from the primary gaming unit or the secondary indicator as changed by the multiplier, or a separate, plurality of payouts from the primary gaming unit and the secondary indicator either with or without modification by a multiplier.

According to one preferred embodiment of the present invention, the mechanical bonus payout indicator is electronically operated and is linked to a random number generator which determines where the secondary indicator actually stops.

According to another preferred embodiment of the present invention, when the primary unit stops on one of a predetermined plurality of winning indicia sets, a second event actuator is placed in an active state. According to this embodiment, a person, such as the player, must actuate the actuator in order to operate the bonus indicator.

According to another embodiment of the present invention, the bonus actuator requires operator intervention so that a player must involve a casino attendant who can activate the bonus indicator.

According to another preferred embodiment of the present invention, the bonus indicator is connected to a drive mechanism which gradually reduces the rate of spin of the bonus wheel before the bonus wheel stops.

Still other embodiments of the present invention comprise gaming devices having electronic means for displaying indicia of rotatable reels such as a video screen and/or means for displaying indicia of a secondary payout indicator, such as a video screen. The present invention also comprises methods for playing a game of chance. One preferred method comprises the steps of displaying a first randomly selected combination of indicia, said displayed indicia selected from the group consisting of slot reels, indicia of at least one reel, indicia of at least one playing card, and combinations thereof; generating at least one signal corresponding to at least one select display of first indicia; providing at least one discernible indicia of a mechanical bonus indicator, said bonus indicator indicia indicating at least one of a plurality of possible payouts, wherein said bonus indicator indicia providing means is operatively connected to said first, standard gaming unit and actuatable in response to said signal. According to one preferred embodiment, the discernable indicia of a mechanical bonus indicator gradually reduces the rate of movement of the mechanical bonus indicator for some period of time prior to actually providing the discernable indicia of a payout. According to another embodiment, a multiplier is provided to multiply at least one payout by a multiple which is most preferably indicated to a player. The multiple can preferably sequentially change as discernable indicia change. For example, a plurality of multiples can be synchronized with a plurality of discernable indicia on the mechanical bonus indicator such that the multiple changes as the payout indicated changes.

Further embodiments of the present invention comprises a method of conducting a game of chance comprising the steps of providing a player with an opportunity to place a wager; displaying a randomly selected combination of indicia, said displayed indicia selected from the group consisting of reels, indicia of at least one and preferably a plurality of reels, indicia of at least one and preferably a plurality of playing cards, and combination thereof; generating at least one signal corresponding to at least one select display of said indicia; providing at least one discernible indicia of a mechanical bonus indicator, said bonus indicator indicia indicating at least one of a plurality of possible bonuses, wherein said bonus indicator indicia is in the form of a wheel or reel and is actuatable in response to said signal.

Other embodiments provide methods and gaming devices wherein a secondary gaming unit comprises indicia of a TIC-TAC-TOE-type game. According to this embodiment, a player receives awards based upon the outcome of a randomly determined TIC-TAC-TOE-type game.

DETAILED DESCRIPTION

Figure 1:
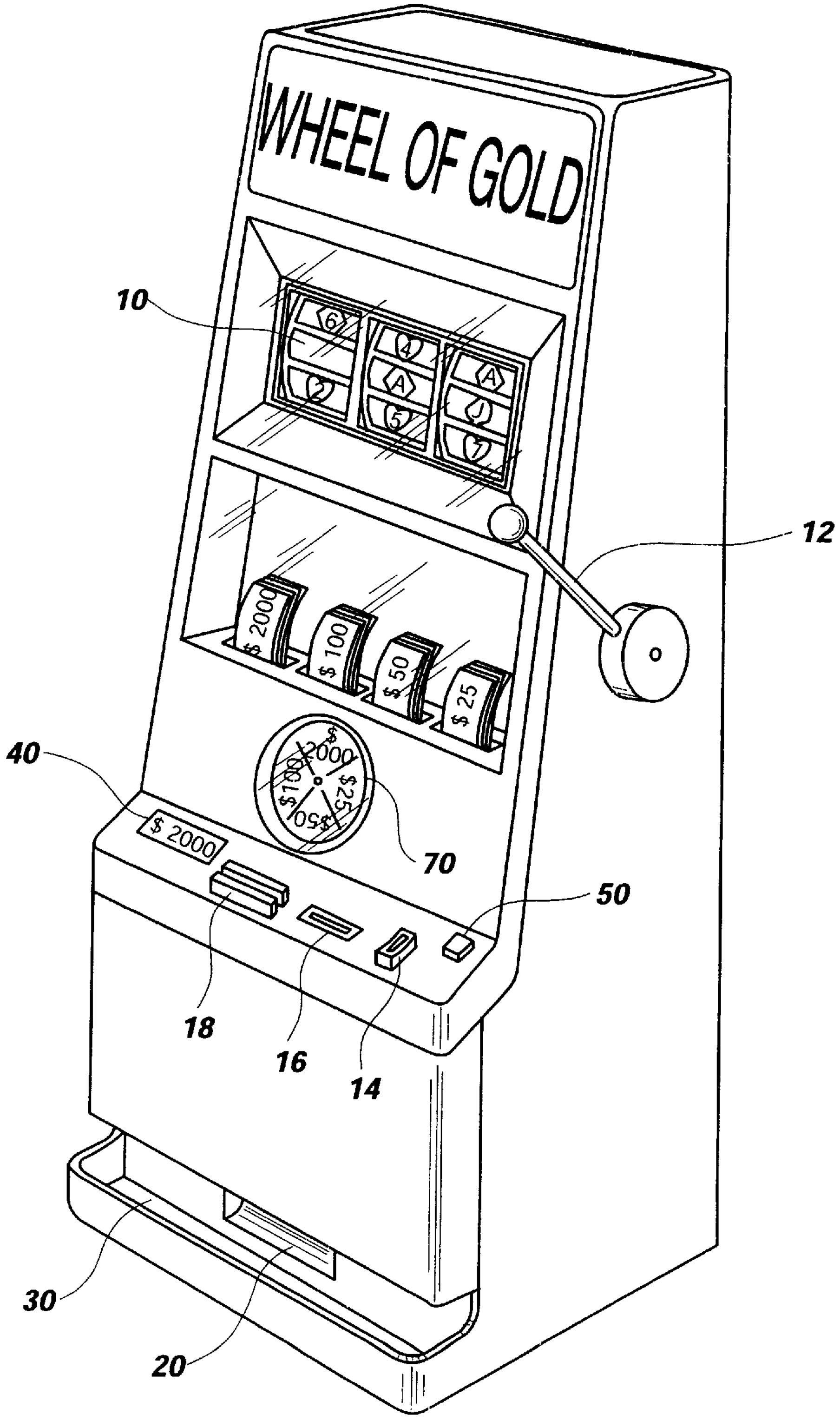
FIG. 1 is a perspective view of a gaming device of one embodiment of the present invention.

The various embodiments of the present invention are designed to provide added excitement to a board/table game or gaming device in order to increase the enjoyment of players and to serve as an added attraction to potential players. One preferred embodiment of the present invention, illustrated in FIG. 1, comprises a primary gaming unit which comprises three rotatable reels 10, each of which comprise a plurality of indicia on the periphery thereof. The illustrated gaming device comprises a mechanical lever 12, coin slot 14, currency validator 16 and a credit card validator 18. In a manner which will be recognized by those skilled in the art, each reel 10 is designed to rotate and then stop in order to visually display at least one, and preferably a number of indicia. If the collection of indicia displayed by the three reels is one of a predetermined plurality of winning indicia sets, then the player can typically be provided with a winning payout either through coin chute 20 which deposits winnings into a coin trough 30 or by increasing the player's credits in a credit window 40.

Figure 2:
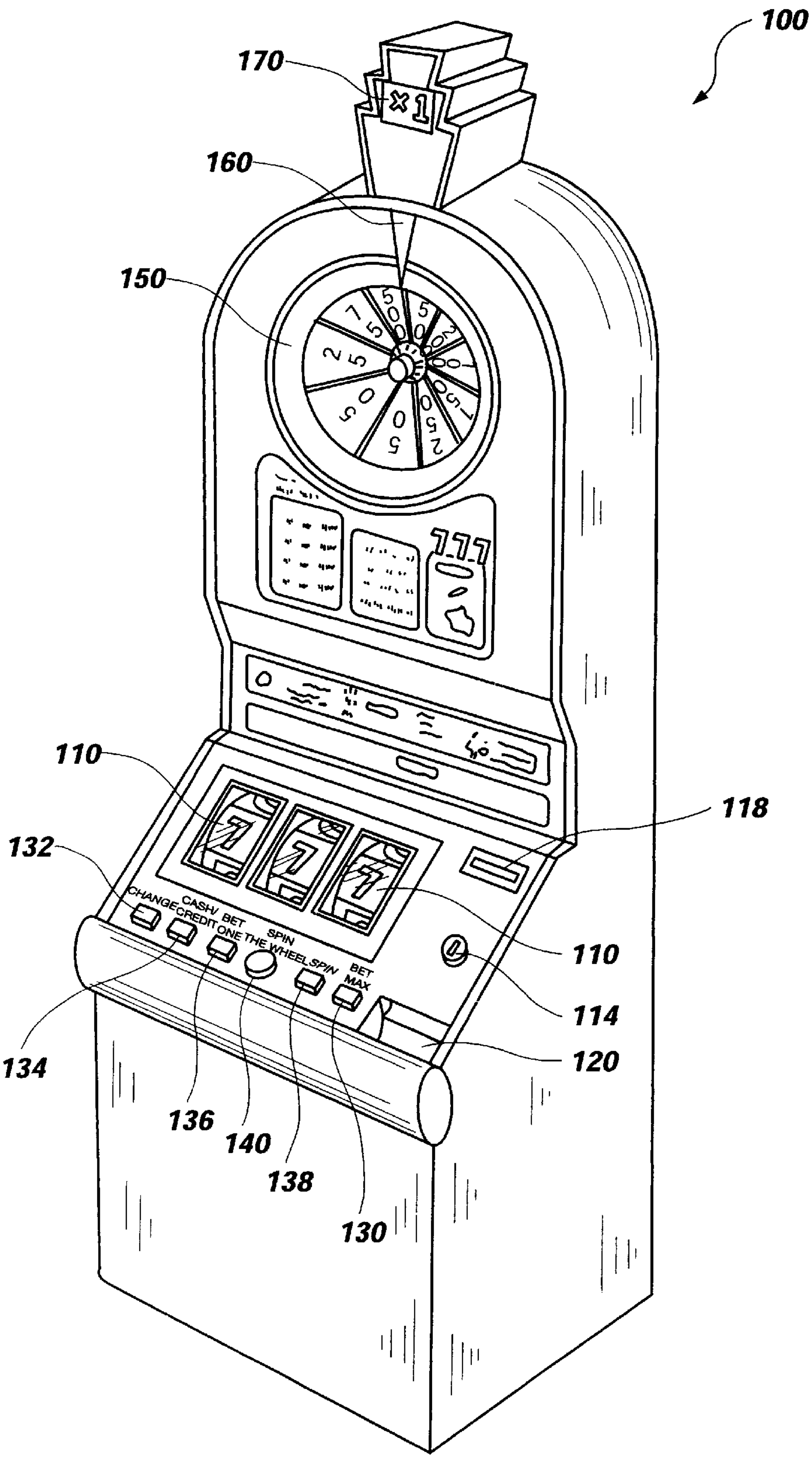
FIG. 2 is another embodiment of a gaming device of the present invention.

According to one aspect of the present invention, when the reels 10 display at least one of a plurality of predetermined winning indicia or indicia sets then the player is provided with an opportunity for a secondary payout. According to this illustrated embodiment of the present invention, a bonus actuator button 50 is placed in an operative state when reels 10 display a bonus indicia set. A player must then depress bonus actuator button 50 in order to start bonus indicator 70 spinning. In the illustrated embodiment, bonus indicator 70 is in the form of a rotatable wheel. The wheel may be a carnival-type wheel comprising pegs and a clapper or could take one or more other forms, such as a fanciful wheel typically used in a roulette game as shown in the embodiment of FIG. 2. If a preferred motor driven wheel is utilized, it is preferably linked to some random value generator in order to randomly determine where the wheel will actually stop. In order to enhance the playing experience, sound effects corresponding to a clapper slapping against pegs of a carnival wheel are preferably provided as the wheel passes from one segment to another. The bonus indicator 70 is also preferably controlled so that the rate of spin is reduced, most preferably gradually reduced, prior to stopping in order to simulate a mechanical spinning wheel.

The facing surface of bonus indicator 70 of FIG. 1 comprises four distinct areas bearing indicia of the bonus payout to the player. In the illustrated embodiment, the bonus indicator has areas indicating bonuses of $25.00, $50.00, $100.00, and $2,000.00. When bonus indicator 70 stops, an indicator (not shown) will indicate the area on the bonus wheel corresponding to the amounts of the bonus to be provided to the player.

In a manner which will be appreciated by those skilled in the art, bonus indicator 70 can be operatively linked to a "payout" mechanism which provides a bonus payout to a player through coin chute 20 or by increasing the amount of winnings shown in credit window 40. As stated above, the payout of the bonus indicator can be in addition to a standard payout by the primary gaming unit or can be in place of the payout normally associated with the primary gaming unit.

Those familiar with gaming and game shows, will appreciate that players and observers typically experience a heightened level of anticipation and excitement as they observe one or more moving objects approaching a winning position. It is therefore most preferred for the bonus indicator of the present invention to be readily discernible, e.g., clearly visible and/or audible to the player.

According to another preferred embodiment of the present invention, a bonus indicator is connected to a electronic control unit, for example a motor, which gradually decreases the rate of movement of the bonus indicator before the bonus indicator stops. According to this embodiment of the present invention, players can be provided with a realistic sense of a totally mechanical indicator. Those skilled in the art will appreciate that such a control unit can also readily be connected to a random generator which will randomly select the winning payout according to a predetermined frequency of occurrence for each, individual bonus payout, and then cause the bonus indicator to stop at the desired area. Those skilled in the art will also appreciate that other mechanisms can be utilized for gradually decreasing the rate of movement of the secondary payout indicator, e.g., a controlled braking system.

According to another embodiment of the present invention, when reels 10 display an indicia set which will provide a bonus, the bonus indicator becomes activatable but requires intervention by a house attendant, such as a casino attendant, in order to actuate the bonus indicator.

According to this embodiment of the present invention, the casino is provided with greater control over the actuation of the bonus indicator and, if desired, can accompany the actuation of the bonus indicator with great fanfare. It will be appreciated that the amounts of the bonus indicated in the figures are merely for purposes of illustration and, if desired, one of the amounts on the bonus indicator can have a significantly greater value. For example, one of the areas on the bonus indicator may correspond to a new automobile, a luxury vacation or a very large sum of money.

While the illustrated embodiment of the present invention in FIG. 1 is generally in the form of a rotatable wheel, other visible, mechanical indicia can be provided, whether controlled totally mechanically, electro-mechanically, or electronically without departing from the scope of the present invention.

As shown in FIG. 1, in order to provide additional levels of excitement, indicia of the possible bonuses are preferably visibly displayed within the slot machine. For example, in one illustrated embodiment, a shelf is preferably displayed comprising piles of currency equal to the amounts on the bonus indicator. While actual cash is preferred, the slot machine may also be provided with fake currency or simply indicia of actual currency or the other bonus prizes.

A preferred embodiment of the present invention is illustrated in FIG. 2 wherein a gaming device 100 comprises a primary gaming unit in the form a standard three-reel slot machine which displays reels 110. Suitable controls and currency mechanisms including a coin slot 114, bill validator 118, and payout chute 120 are provided. Furthermore, suitable player controls including CHANGE button 132, CASH/CREDIT button 134, BET ONE button 136, SPIN button 138 and BET MAX button 130 are also provided.

In addition to these standard controls the control panel of this preferred illustrated embodiment of the present invention comprises a SPIN THE WHEEL button 140 which becomes actuatable when the primary gaming unit, as indicated by reels 110, has randomly selected one of a plurality of predetermined indicia sets. While the primary gaming unit shown in the lower portion of the cabinet of gaming device 100 will typically have the ability to provide a plurality of winning payouts, the SPIN THE WHEEL button 140 can become actuatable when the stopped reels 110 indicate some subset of the primary unit's winning indicia, when any one of the winning reel indicia are displayed, or further in response to one or more other predetermined indicia, or a combination thereof. For example, the SPIN THE WHEEL feature, or some other secondary game, can be actuated or become activatable in response to a single indicia indicated on one of the reels or reel indicia.

When the SPIN THE WHEEL button 140 is actuated by a player, bonus wheel 150 is caused to rotate and randomly select and display one of a plurality of different areas. According to the preferred illustrated embodiment, all of the bonus areas indicate an increased winning value for the player. However, it is within the scope of the present invention to provide non-monetary prizes or losing spaces wherein no additional prize is provided and/or wherein the prize normally associated with the indicia shown on the primary gaming unit reels 110 is reduced. In the illustrated embodiment, a pointer 160 advantageously indicates the result of the bonus wheel 150.

In addition to the bonus wheel 150, this preferred illustrated embodiment of the present invention also comprises a bonus multiplier 170. The multiplier 170 preferably randomly selects a value by which the bonus indicated by bonus wheel 150 is multiplied. For example, the bonus indicator 170 can have an LED screen which cycles through multipliers of "times one", "times two" and "times three" which will indicate that the bonus is as indicated, doubled, or tripled, respectively. The multiplier 170 can be programmed to select a multiplier either totally randomly or according to some other predetermined frequency of occurrence wherein certain multipliers will occur more frequently than other multipliers. While this illustrated embodiment comprises whole number multipliers, it is also within the scope of the present invention to utilize values other than whole numbers or to include multipliers which will result in a decrease in the value shown by the bonus indicator 150. For example, a multiplier sequence could include a "times zero" value. When bonus wheel indicator 150 is not in use, the multiplier LED window can be set to an attract mode wherein a message is displayed to players or potential players. For example, the LED display could show a message, either in complete form or can be set to sequentially display either words or individual letters, such as "SPIN-THE-WHEEL".

According to the various embodiments of the present invention, the bonus multiplier or additional payout multiplier is most preferably synchronized with the movement of the rotatable wheel or indicia of a rotatable reel, such that the multiplier value will change as each wheel segment passes the indicator. The most preferred embodiments of the present invention additionally comprise audible signals, such as the clicking of a clapper of the type found on an actual spinning wheel comprising a clapper indicator and pegs which strike the clapper. The audible signals are preferably also synchronized with the segments of the wheel such that an audible signal is provided as the wheel moves from one segment to another. This advantageously provides the effect of a mechanical wheel comprising pegs moving past a mechanical clapper.

Figure 3:
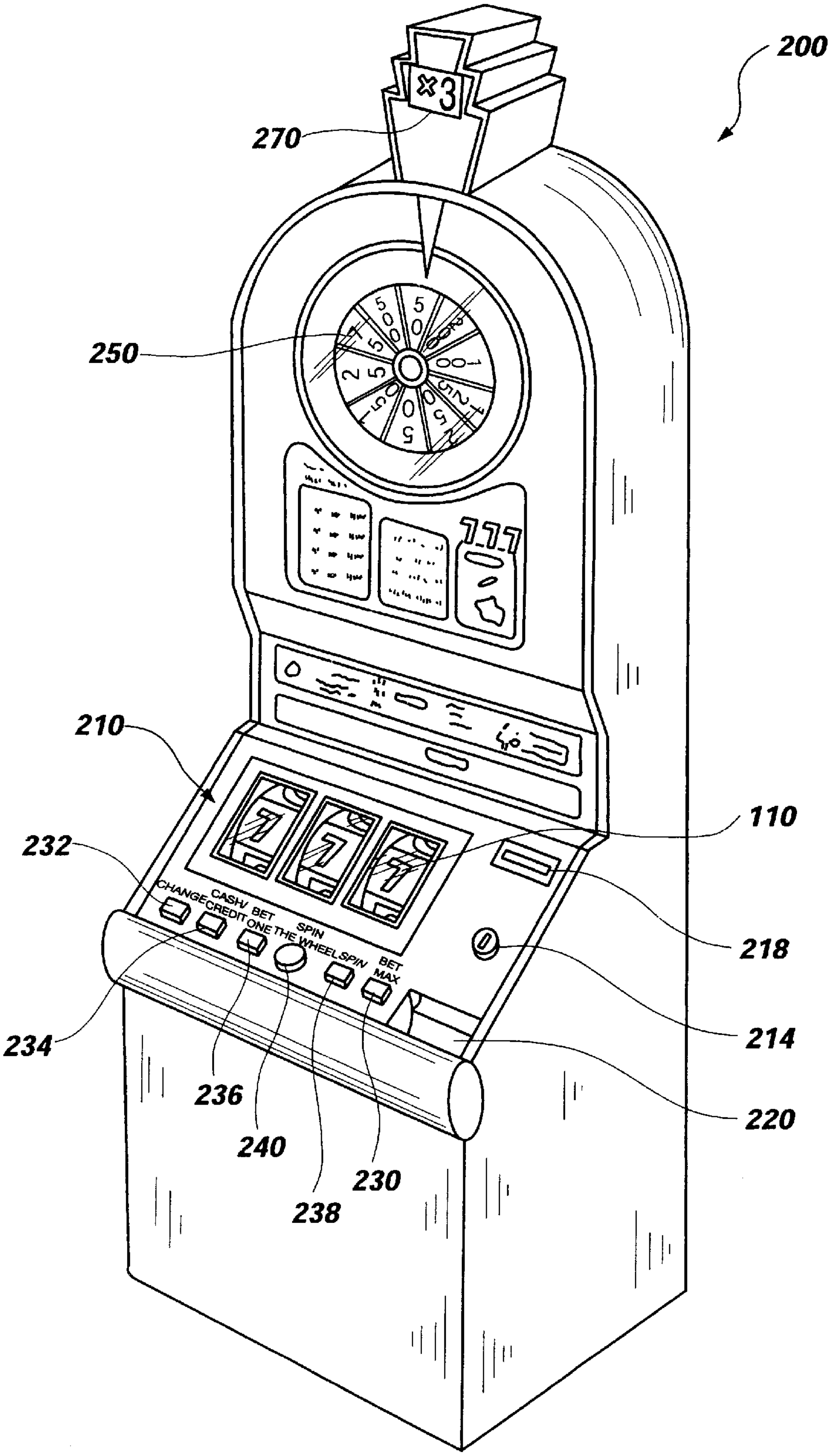
FIG. 3 illustrates an alternative embodiment of the present invention.

FIG. 3 illustrates a less preferred embodiment of the present invention wherein a gaming device 200 comprising similar controls as the controls illustrated in the embodiment of FIG. 2. In this illustrated embodiment, and wherein a bonus indicator 250 is in the form of an electronically generated image, such as a video screen or an LED display and provides discernible indicia, e.g., a visual video display, of a bonus wheel. For example, the video display can show a wheel of the type used in a roulette game such as the wheel 150 illustrated in FIG. 2. A bonus multiplier 270 is also included in gaming device 200.

The slot machine shown in FIG. 3 comprises a video display 210, such as a video screen, which displays images of three reels 110, each of which comprise a plurality of indicia. In addition, this slot machine comprises a video display, such as a second video screen, for displaying a bonus payout indicator 250. While separate screens are preferred, both the reels and the bonus payout indicator could be displayed on the same video screen. According to this embodiment of the present invention, the bonus payout indicator displays indicia of a wheel or a reel.

In a manner known in the art, the gaming device comprises a coin slot 214, a currency validator 218, and a coin chute 220. Additional player control's include CHANGE button 232 and CASH/CREDIT BUTTON 234. After placing a wager, a player determines the amount of his wager by either pressing the BET ONE button 236 or the BET MAX button 230. After the player has selected the amount of his wager, he depresses the SPIN button 238 which "spins" the reels shown in video display window 210.

Each indicia of a displayed reel 110 is designed to indicate rotation and then stop in order to visually display at least one, and preferably a number of indicia. When reels 110 display a particular indicia set or one of a predetermined plurality of indicia sets, then the additional payout mode is activated and bonus indicator 250 displaying possible payouts is placed in an operable state. In this illustrated embodiment, the bonus indicator 250 displays an indicia of a rotating wheel comprising a plurality of distinct areas bearing indicia of payouts to the player. Bonus indicator 250, is caused to selectively indicate one of the plurality of indicia, either automatically, upon intervention of a casino or house attendant, or upon a player depressing SPIN THE WHEEL button 240 in order to start bonus indicator 250 spinning. It will be appreciated that the amounts of the payout indicated in FIG. 3 are merely for purposes of illustration and, if desired, one of the amounts on the bonus indicator can have a greater value, e.g., a new automobile, a luxury vacation or large sum of money which may be collected subsequently, or lesser values, e.g., no payout.

The displayed reels 110 and displayed bonus indicator 250 can be operably controlled by suitable controls to gradually slow down as they come to a complete stop, displaying a selected reel indicia and a bonus indicia, respectively.

The embodiment of the present invention illustrated in FIG. 2 is considered most preferable since it is believed that players prefer to see actual slot reels and an actual bonus wheel spinning in a gaming device. Other, less preferred embodiments are also possible while providing some of the advantages of the present invention. Specifically, it is feasible to replace the spinning reels with other forms of standard gaming units, for example, a visible indicia of reels or indicia of playing cards, shown for example on a video screen. It is also possible to replace the wheel with some other discernible indicia of a mechanical bonus indicator which is operatively connected to the first standard gaming unit and which either automatically commences or is actuatable in response to the result provided by the standard gaming unit. According to the present invention, both the standard gaming unit and bonus indicator are controlled to provide random results.

From the foregoing description, it will be appreciated that embodiments of the present invention, which are specifically directed to gaming and gaming devices, comprise three different indicators. The most preferred embodiments comprise a primary (standard) gaming unit, an additional payout indicator, preferably in the form of a wheel, and a payout multiplier. While the illustrated payout multiplier of the illustrated embodiments is in the form of an electronically selected value, it is also within the scope of the present invention to have a multiplier which involves some skill on the part of a player. For example, according to an additional preferred embodiment of the present invention, a player will shoot actual projectiles, such as coins, at one or more targets in an effort to increase the value of the multiplier. In any of the embodiments of the present invention utilizing a multiplier, the multiplier can affect the value of a payout from the standard gaming unit, the additional payout indicator, or both the standard gaming unit and the payout indicator.

As stated above, the present invention also includes methods of conducting a wagering game of chance comprising the steps of providing a player with an opportunity to place a wager; displaying a randomly selected combination of indicia, said displayed indicia selected from the group consisting of reels, indicia of reels, indicia of playing cards, and combinations thereof; generating at least one signal corresponding to at least one select display of said indicia; providing at least one discernible indicia of a mechanical bonus indicator, said bonus indicator indicia indicating at least one of a plurality of possible bonuses, wherein said bonus indicator indicia is in the form of a wheel or reel and is actuatable in response to said signal. A further preferred method comprises the step of displaying at least one value by which a payout may be multiplied.

Another method of the present invention comprises the steps of requiring at least one player to make a wager; displaying at least one randomly selected playing card from a predetermined card indicia set; displaying and rotating a rotatable wheel comprising a plurality of indicia corresponding to a plurality of prizes if said displayed playing card indicia is one of a preselected plurality of winning card indicia; and determining a winning payout with said wheel, wherein said winning payout is randomly selected.

Figure 4:
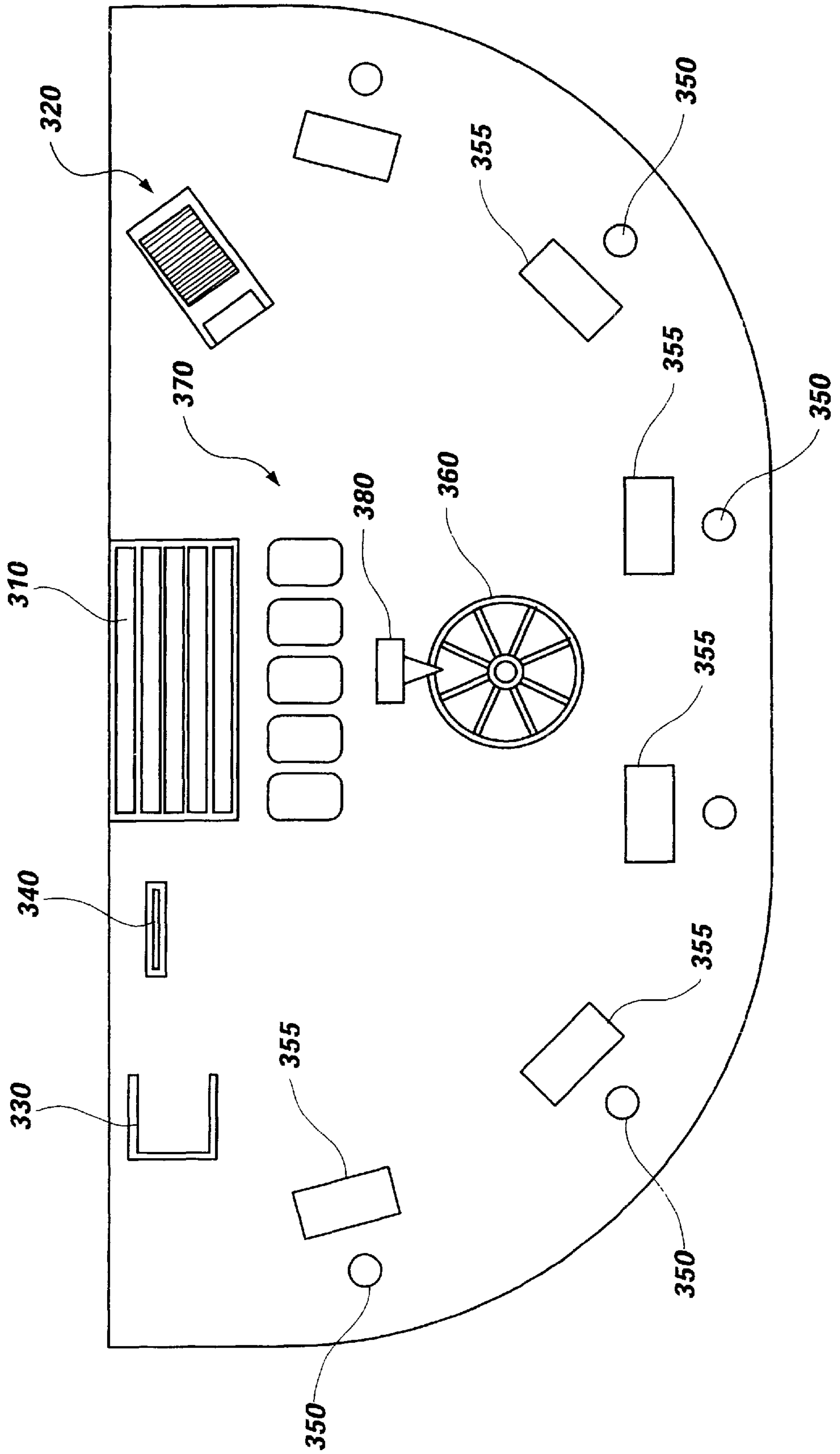
FIG. 4 is an alternative embodiment of the present invention in the form of a table game.

Another embodiment of the present invention in the form of a table game is illustrated in FIG. 4 wherein a chip rack 310, card shoe 320, discard shoe 330, wager slot 340, betting areas 350, and secondary event wheel 360 are provided. According to this embodiment of the present invention, after one or more players have placed wagers in betting areas 350, a dealer will provide cards to the wagering players in areas 355 and then provide cards to himself in card area 370. After the cards have been dealt, the initial bets can be resolved by comparing the players' cards to the dealer's cards. While the illustrated game is shown as five card stud poker, other games and arrangements can also be utilized without departing from the scope of the present invention. For example, a player's cards can be compared to other player's cards or a predetermined payout schedule, or other card games can be utilized including seven card draw, five card draw poker, black jack, etc.

Upon the happening of a predetermined occurrence, such as the receipt of one of a preselected plurality of card hands, one or more of the players can be given the opportunity to spin the secondary event wheeler 360, which is most preferably electronically operated by an actuation switch. The actuation switch can be within reach of the players for added excitement or can be actuated by the dealer. Alternatively, actuation by a player's actuator switch can require prior actuation of a dealer switch which will then render the player's switch operable. If less than all of the players are going to benefit from the results of secondary event wheel 360, additional indicators can be positioned proximate the players in order to indicate which players are involved in the spin of secondary event wheel 360. In a manner similar to that shown in FIG. 2, a payout multiplier 380 is also provided. Sound effects as referenced above and means for gradually decreasing the rate of movement of the secondary event wheel 360 are also preferably provided.

In addition to the primary gaming unit or primary game, the secondary event indicator, and the payout multiplier, another preferred aspect of the present invention which can be utilized with all previously described embodiments comprises a DOUBLE-OR-NOTHING feature wherein winning players may wager their winnings in a double-or-nothing fashion. According to this feature of the present invention, a player may be provided with the opportunity to bet on red or black after he has won a game. For this purpose, the rotatable wheels of the present invention are preferably provided with alternating red and black pie-shaped segments. According to this feature, a player can be provided with the opportunity of betting on red or black with the opportunity of doubling his winnings if he makes a correct selection. After the player makes his selection, the wheel would be rotated to determine whether the player has successfully doubled his winnings or has lost those winnings. A player may be provided with the opportunity of utilizing the double or nothing feature several times and/or up to a certain maximum to be determined by the game operator.

According to another embodiment of the present invention, the secondary gaming unit is generally in the form of a TIC-TAC-TOE-type game. This embodiment is illustrated, in part, in FIGS. 5–8 which comprises a primary gaming unit in the form of a three reel slot machine. While the primary gaming unit of this embodiment is a three reel slot machine, other forms of primary gaming units can be utilized without departing from the scope of the present invention.

Figure 5:
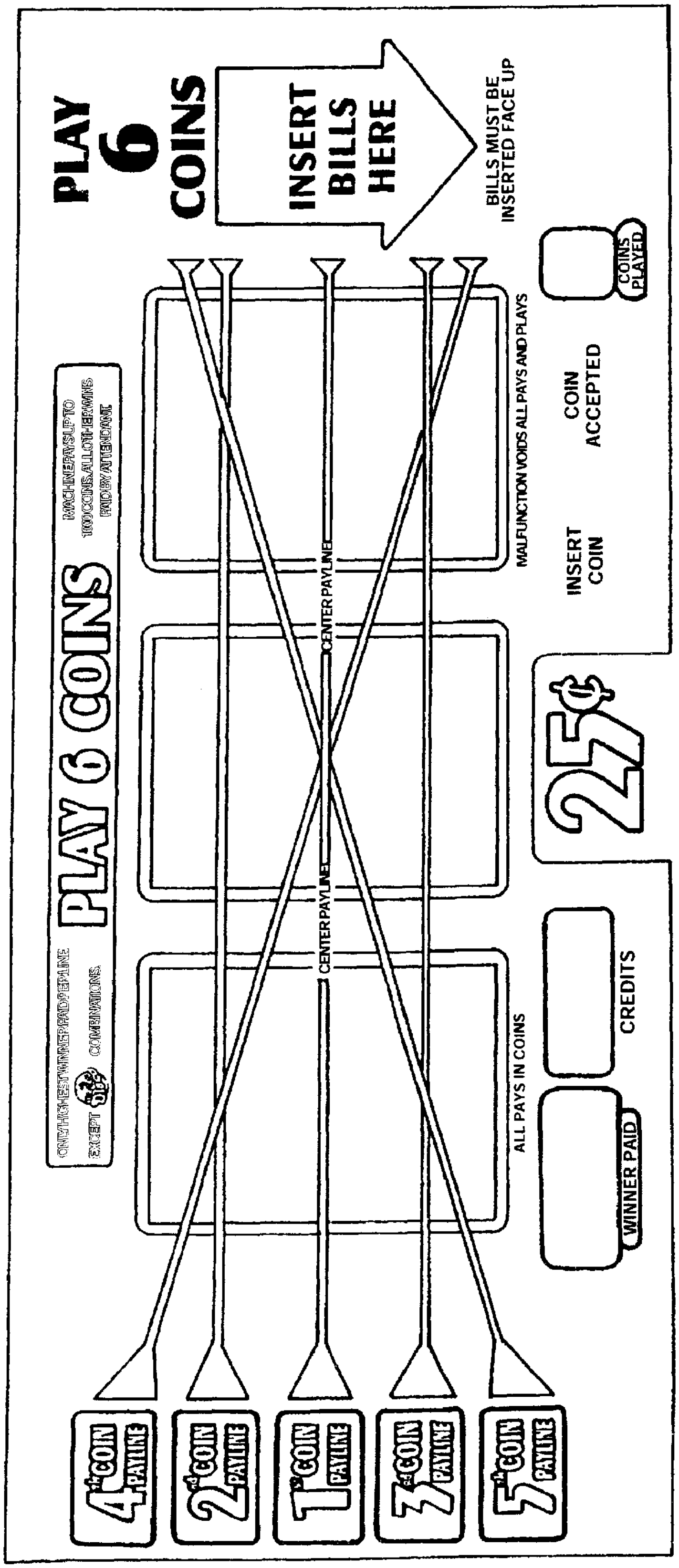
FIG. 5 illustrates a reel screen for a primary game of an alternative embodiment of the present invention.

According to this illustrated embodiment, the primary game has multiple pay lines. If a player deposits a single coin, he will qualify for winning combinations only if a winning combination appears on the center pay line. If the player deposits two coins, then the player will qualify for both the center payline and the payline above the center payline. Other paylines are obtained with coins 3–5 which correspond to a lower payline, first diagonal payline, and a second diagonal payline, respectively, all of which are illustrated in FIG. 5.

According to this embodiment of the present invention, a player can qualify for playing the secondary TIC-TAC-TOE-type game, hereinafter referred to as TIC-TAC DISCO, if the player obtains at least one predetermined event on the primary gaming unit. That predetermined event can obtain a special TIC-TAC-DISCO symbol which can be present on one of the reel strips (not shown) or can comprise any one of a plurality of possible pre-determined outcomes which qualify and activate the secondary TIC-TAC DISCO game.

Figure 6:
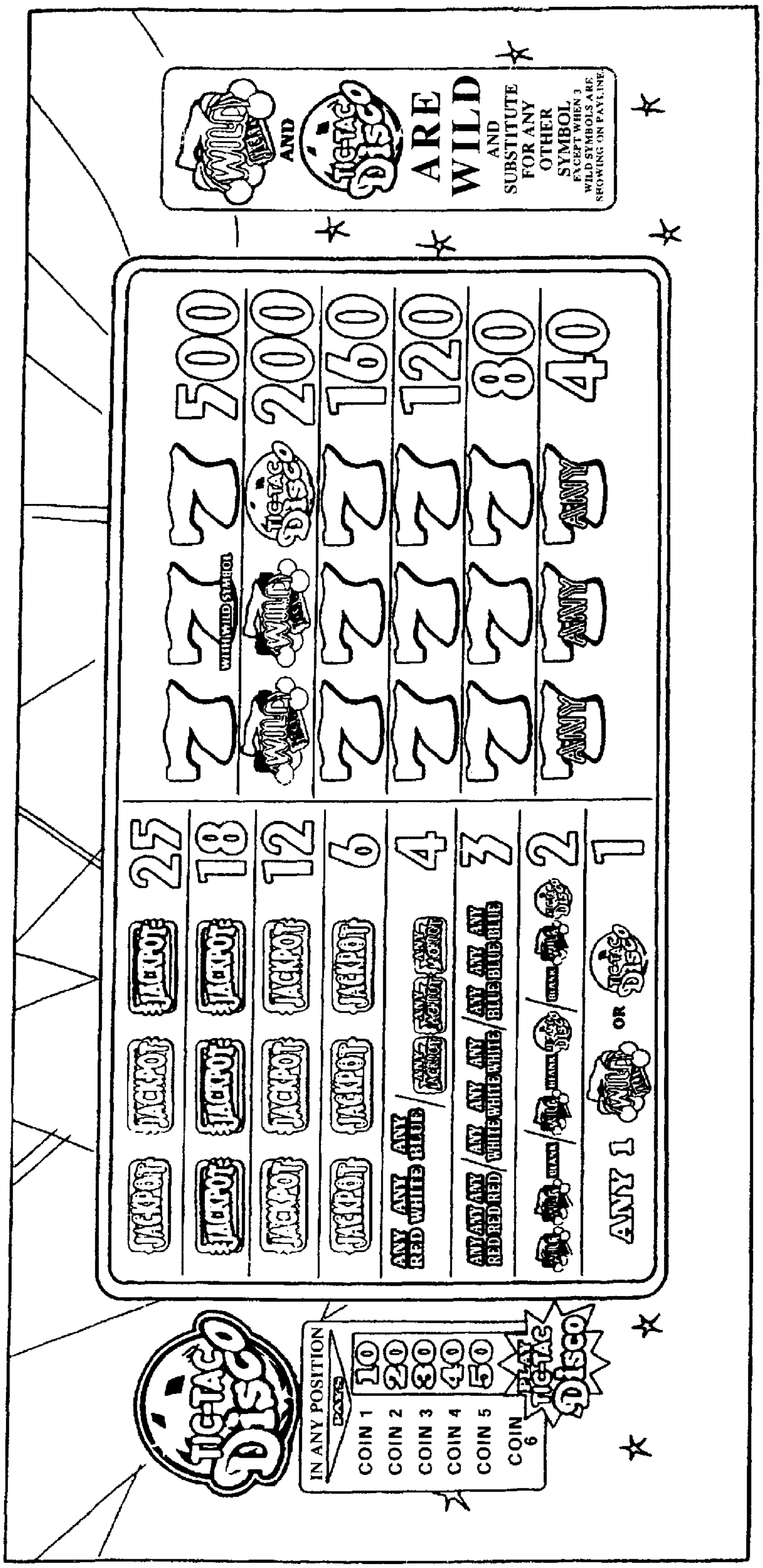
FIG. 6 illustrates a payout table for a TIC-TAC-TOE-type game of the embodiment illustrated in FIG. 5.

FIG. 6 illustrates one form of payout schedule for the primary gaming unit of this embodiment of the present invention, however, from the present description those skilled in the art will appreciate that other payout schedules can be utilized without departing from the scope of the present invention.

Playing the secondary event can also be dependent upon the player wagering the maximum number of coins, for example, in the illustrated embodiment five coins.

Figure 7:
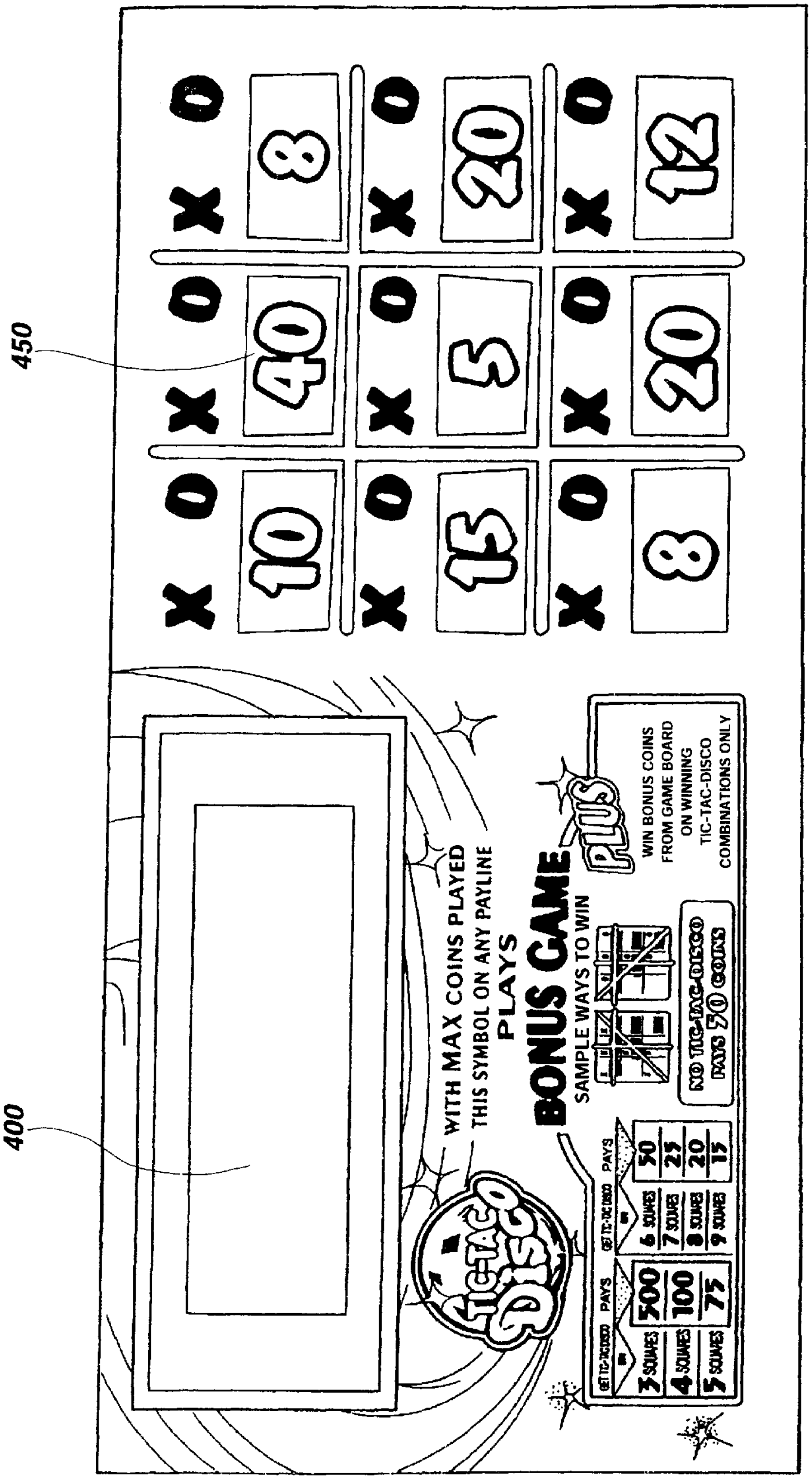
FIG. 7 illustrates a display of a secondary gaming unit of the embodiment illustrated in FIGS. 5 and 6.

When the player qualifies for activating the secondary TIC-TAC DISCO game, a screen 400 and/or a TIC-TAC-TOE-type display will randomly and alternately select X's and O's for the TIC-TAC-TOE-type display 450. For example, screen 400 can indicate that for box no. 1 on display 450 an X had been selected, while on box no. 2 an O had been selected, etc. for all nine boxes. Alternatively, the X's and O's indicated on TIC-TAC-TOE-type display 450 can be illuminated to reveal whether a given box has been designated as an X or an O. The determination of whether a particular box is designated as an X or an O can be determined separately from other boxes or the result of the game can be determined randomly and then a pre-determined sequence of X's and O's which indicate that a randomly selected final outcome can be implemented for entertainment purposes. In addition to the display screen 400 and the X's and O's for each box in TIC-TAC-TOE-type display 450, the backgrounds of the boxes of the TIC-TAC-TOE-type display 450 can be either darkened or illuminated in a different form in order to indicate the designation accorded to that particular box. As indicated in FIG. 7, each of the boxes in the TIC-TAC-TOE-type display 450 are provided with numbers. In this illustrated embodiment, these numbers indicate the amount of a players award if the player obtains a "TIC-TAC-TOE", i.e. three in a row display of X's or O's. For example, with reference to FIG. 7, if a player obtains three O's along the top boxes, then the player would receive a payout equal to 58 coins (58 being the sum of 10+40+8).

Alternatively, according to this embodiment of the present invention, the player can decide whether he wishes to be X's or O's, and then the player receives an award equal to the sum of the boxes which receive X's and O's, regardless of whether the player attains three of the same symbols in a row.

Figure 8:
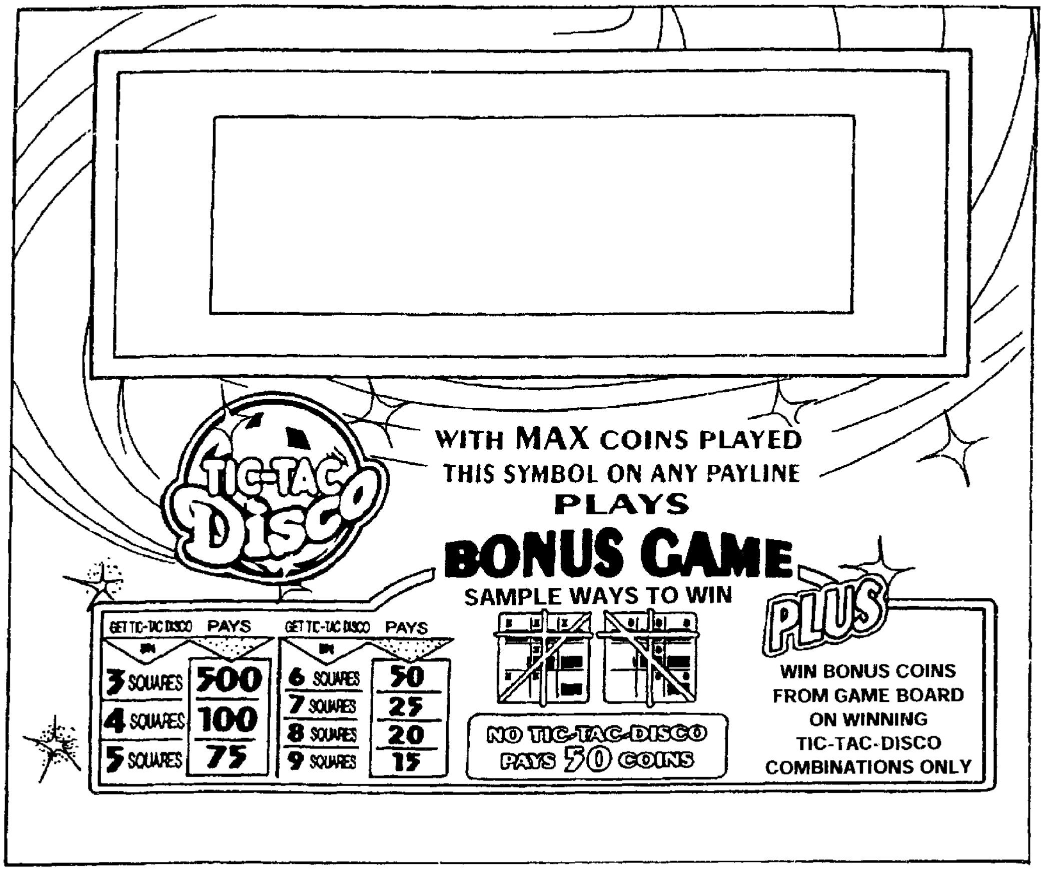
FIG. 8 is an expanded view of the payout schedule and a display window of a TIC-TAC-TOE-type embodiment of the present invention.

Furthermore, according to another preferred aspect of the present invention, best illustrated in FIG. 8, in addition to obtaining an award for the amount shown in the boxes, if a player achieves three symbols in a row, the player is provided with a bonus payout depending upon the number of squares which were illuminated when the player obtained three symbols in a row. As indicated, if only three squares were illuminated, the player would receive a bonus payout of 500 coins, wherein if 4 squares were illuminated then the bonus would be 100 coins, 5 squares providing 75 coins, 6 squares providing 50 coins, 7 squares providing 25 coins, 8 squares providing 20 coins, and 9 squares providing 15 coins. Still furthermore, if the player did not attain three in a he could be provided with a consolation price of 50 coins.

In addition to the activation of the TIC-TAC-TOE-type game, the playing of the secondary gaming unit is accompanied by broadcasting of music from the gaming device in order to add to excitement and entertainment of the overall experience.

What is claimed is:

1. A method of conducting a game of chance, comprising:

providing an opportunity to place a wager to play a primary game;

responsive at least in part to placement of a wager, randomly generating in primary game a combination of indicia selected from a plurality of possible indicia and displaying the combination of indicia on a display associated with the primary game, the display comprising a visible representation of a plurality of reels, only one of the reels bearing an indicia for enabling play of a secondary game comprising a TIC-TAC-TOE game having a three-by-three matrix display associated therewith; and responsive to display on the one reel of the indicia for enabling play of the secondary game, randomly selecting indicia of a TIC-TAC-TOE game in the secondary game and displaying the selected indicia on the three-by-three matrix display.

2. A method of conducting a game of chance according to claim 1 further comprising providing a player with one of a plurality of potential prizes responsive to one of a plurality of outcomes of the secondary game.

3. A method of conducting a game of chance, comprising:

providing an opportunity to place a wager to play a primary game;

responsive at least in part to placement of a wager, randomly generating in the primary game a combination of indicia selected from a plurality of possible indicia and displaying the combination of indicia on a display associated with the primary game, the plurality of indicia including at least one indicia for enabling play of a secondary game comprising a TIC-TAC-TOE type game having a matrix display associated therewith; and responsive to display of the at least one indicia for enabling play of the secondary game and without further input by a player once the secondary game has commenced, randomly generating indicia of the TIC-TAC-TOE type game in the secondary game and displaying the generated indicia on the matrix display.

4. The method of claim 3, further comprising selecting the at least one indicia for enabling play of the secondary game to consist of either a single indicia for enabling play of the secondary game or a preselected combination of indicia.

5. The method of claim 3, further comprising enabling play of the secondary game only in response to placement of a wager greater than a minimum wager required to play the primary game.

6. The method of claim 3, wherein the TIC-TAC-TOE type game employs at least two different symbols for display and further comprising randomly generating a symbol for each location of a plurality of locations on the matrix display for display thereon prior to randomly generating a next symbol for display on another location of the plurality of locations on the matrix display.

7. The method of claim 3, wherein the TIC-TAC-TOE type game employs at least two different symbols for display and further comprising randomly generating a sequence of symbols for display and subsequently displaying the symbols of the sequence in a predetermined order on each of a plurality of locations on the matrix display.

8. The method of claim 3, wherein the TIC-TAC-TOE type game employs at least two different symbols for display and further comprising differently illuminating each of at least two of the at least two symbols on the matrix display.

9. The method of claim 3, wherein the TIC-TAC-TOE type game employs at least two different symbols for display, wherein the matrix display includes a plurality of locations and each location of the plurality has a number associated therewith and further comprising, responsive to selection of one of the at least two different symbols for display in a line of locations extending across the matrix, providing an award consisting of the sum of the numbers associated with the locations in the line.

10. The method of claim 9, further comprising employing a fixed number in association with each location of the plurality.

11. The method of claim 3, wherein the TIC-TAC-TOE type game employs at least two different symbols for display, wherein the matrix display includes a plurality of locations and each location of the plurality has a number associated therewith, further comprising enabling a player to select one symbol from the at least two different symbols and providing an award consisting of the sum of the numbers associated with each location on the matrix display wherein the selected symbol appears.

12. The method of claim 11, further comprising employing a fixed number in association with each location of the plurality.

13. The method of claim 3, wherein the TIC-TAC-TOE type game employs at least two different symbols for display, wherein the matrix display includes a plurality of locations and further comprising providing an award when a plurality of occurrences of a single symbol is generated for display in a line of locations extending across the matrix, the award being inversely related in magnitude to the number of symbols required to be generated on the matrix display until the line of locations is completed.

14. The method of claim 13, further comprising providing a consolation award to a player if, after all of the locations of the matrix display have a symbol displayed thereon and there is no line of locations extending across the display wherein a single symbol is displayed.

* * * * *